(12) United States Patent
McCartney et al.

(10) Patent No.: US 10,389,261 B2
(45) Date of Patent: Aug. 20, 2019

(54) PORTABLE ELECTRICAL GENERATOR SYSTEM FOR PROVIDING TEMPORARY DISTRIBUTION OF SINGLE-PHASE AND THREE-PHASE POWER

(71) Applicant: VMC Power Systems, Angels Camp, CA (US)

(72) Inventors: Mark C. McCartney, Mokelumne Hill, CA (US); Nicolas V. Valente, Angels Camp, CA (US)

(73) Assignee: VMC Power Systems, Angels Camp, CA (US)

( * ) Notice: Subject to any disclaimer, the term of this patent is extended or adjusted under 35 U.S.C. 154(b) by 13 days.

(21) Appl. No.: 15/360,345

(22) Filed: Nov. 23, 2016

(65) Prior Publication Data

US 2017/0077827 A1    Mar. 16, 2017

Related U.S. Application Data

(63) Continuation-in-part of application No. 14/952,229, filed on Nov. 25, 2015, now Pat. No. 9,608,500, which is a continuation of application No. 14/202,374, filed on Mar. 10, 2014, now Pat. No. 9,203,276.

(60) Provisional application No. 62/260,101, filed on Nov. 25, 2015, provisional application No. 61/789,514, filed on Mar. 15, 2013.

(51) Int. Cl.
*H01F 27/02* (2006.01)
*H02M 5/12* (2006.01)
*H01F 30/10* (2006.01)
*H01F 38/24* (2006.01)
*H01F 38/32* (2006.01)
*H01F 27/00* (2006.01)
*F02B 63/04* (2006.01)

(52) U.S. Cl.
CPC ............. *H02M 5/12* (2013.01); *F02B 63/047* (2013.01); *H01F 27/002* (2013.01); *H01F 30/10* (2013.01); *H01F 38/24* (2013.01); *H01F 38/32* (2013.01)

(58) Field of Classification Search
CPC .......................................... H01F 27/00–27/36
USPC ........................................ 336/65, 83, 90–98
See application file for complete search history.

(56) References Cited

U.S. PATENT DOCUMENTS

| | | |
|---|---|---|
| 6,700,214 B2 | 3/2004 | Ulinski et al. |
| 9,203,276 B1 | 12/2015 | McCartney |
| 2002/0153726 A1 | 10/2002 | Sumner |
| 2007/0093280 A1 | 4/2007 | McKay |

(Continued)

FOREIGN PATENT DOCUMENTS

GB    2464192 A  *  4/2010  ........... H01F 27/002

OTHER PUBLICATIONS

Brown; "Section 4: System Voltage Considerations"; Square D Engineering Services; retrieved from http://static.schneider-electric.us/assets/consultingengineer/appguidedocs/section4_0307.pdf.

(Continued)

*Primary Examiner* — Tuyen T Nguyen
(74) *Attorney, Agent, or Firm* — Kilpatrick Townsend & Stockton LLP

(57) ABSTRACT

A portable generator system is used to provide temporary electrical power. The portable generator system has a vehicle, a generator, a step-up system, and a output interface. The step up system has one or more transformers for stepping up a voltage of the generator to a distribution voltage.

13 Claims, 14 Drawing Sheets

(56) References Cited

U.S. PATENT DOCUMENTS

2007/0296223 A1    12/2007  Saylor
2010/0090543 A1     4/2010  Cobb et al.
2011/0298287 A1    12/2011  Cobb et al.
2016/0211729 A1     7/2016  McCartney et al.

OTHER PUBLICATIONS

Tesfatsion; "Homepage for EE/Econ 458: Economic Systems for Electric Power Planning"; Iowa State University; updated Mar. 28, 2015; retrieved from www2.econ.iastate.edu/classes/econ458/tesfatsion/Home458Team.htm.
Cleveland; "Smart grid"; The Encyclopedia of Earth; published Oct. 7, 2009; updated Apr. 24, 2011; retrieved from http:///www.eoearth.org/view/article/51cbeee37896bb431f69af3d/.
Washington State University; "Unit 14: Transformers"; Sep. 2012; pp. 273-316; retrieved from http://css.wsu.edu/wp-content/uploads/2012/09/Transformers1.pdf.
Hyvac Products, Inc.; "AC Power Source Summary"; Power Requirements for NonStop Himalaya Servers—429905-001; retrieved from http://www.hyvac.com/tech_support/electrical_sources_worldwide.pdf.
Non-Final Office Action dated Jun. 9, 2015 for U.S. Appl. No. 14/202,374; 8 pages.
Notice of Allowance dated Oct. 7, 2015 for U.S. Appl. No. 14/202,374; 9 pages.

* cited by examiner

PORTABLE ELECTRICAL GENERATOR SYSTEM FOR PROVIDING TEMPORARY DISTRIBUTION OF SINGLE-PHASE AND THREE-PHASE POWER

CROSS-REFERENCES TO RELATED APPLICATIONS

This application claims priority to U.S. Provisional Patent Application No. 62/260,101, filed on Nov. 25, 2015, entitled "Portable Electrical Generator System for Providing Temporary Distribution of Single-Phase and Three-Phase Power." This application also claims priority to U.S. patent application Ser. No. 14/952,229, filed on Nov. 25, 2015, entitled "Portable Generator System for Providing Temporary Power to an Electrical-Distribution System," which application is a continuation of U.S. patent application Ser. No. 14/202,374, filed on Mar. 10, 2014, entitled "Portable Generator System for Providing Temporary Power to an Electrical-Distribution System," now U.S. Pat. No. 9,203,276, issued on Dec. 1, 2015, which claims the benefit of U.S. Provisional Patent Application No. 61/789,514, filed on Mar. 15, 2013. The disclosures of all of the above-identified patent applications are incorporated by reference in their entireties for all purposes.

BACKGROUND

An electric power system is a network of components to provide electrical power to a plurality of customers. An electric power system can generally be separated into three parts: generation, transmission, and distribution. For generation, electric power is often generated in thee-phases, alternating current (AC) at a power plant (e.g., a coal or natural gas power plant). For transmission, electric power is often stepped up to high voltage (e.g., voltage equal to or greater than 69,000 volts (V) and equal to or less than 765 kV; or equal to or greater than 115 kV and equal to or less than 1200 kV), which is sometimes referred to as transmission voltage, and transmitted by transmission lines. For distribution, electric power is often stepped down from the transmissions lines to medium voltage (e.g., voltage equal to or between 601 V and 35,000 V), sometimes referred to as distribution voltage. In some embodiments, distribution voltage is measured line-to-line (i.e., phase-to-phase). In some embodiments, distribution voltage is between 600 V and 69,000 V. A distribution system conveys electricity, through distribution lines, from a step down transformer (e.g., at a substation) to customers. Electric power is often stepped down from medium voltage at the distribution system to low voltage (e.g., voltage between 0 V and 601 V), sometimes referred to in this application as customer voltage, for a customer. For example, a transformer steps down medium voltage (e.g., 33 kV) to a low voltage (e.g., 240 V) before reaching a weather head at a residence.

BRIEF SUMMARY

This disclosure relates in general to electrical power generation and, but not by way of limitation, to portable systems for providing temporary electrical power. A customer can lose power due to a break in the electric power system (e.g., an electric pole falls during a storm). A customer can also lose power during service on a part of the electric power system. The present disclosure, generally describes systems and methods for providing temporary electric power using a portable electrical generator system and a step-up transformer bank to tap into distribution lines.

In some embodiments, systems and/or methods for stepping up voltage for both single-phase electrical power and three-phase electrical power are disclosed. In some embodiments, a system comprises a first transformer for stepping up voltage; a second transformer for stepping up voltage; and a third transformer for stepping up voltage. The first transformer, the second transformer, and the third transformer are configured to step up three-phase power of a first voltage to a distribution voltage. The first transformer and the second transformer are configured to step up single-phase power of a second voltage to the distribution voltage. In some embodiments, the distribution voltage is predetermined.

In some embodiments, devices and/or methods are disclosed for stepping up voltage for both single-phase electrical power and three-phase electrical power. In some embodiments, a device comprises a core, wherein the core is made of a magnetic material; a first conductor, wherein the first conductor is wound a first number of turns around a first portion of the core; and a second conductor, wherein the second conductor is wound a second number of turns around a second portion of the core. The first number of turns divided by the second number of turns defines a first ratio. The first ratio is greater than a second ratio and less than a third ratio. the second ratio is determined by a ratio for stepping up three-phase power from a first voltage to a target voltage, wherein the first voltage is measured from phase to ground. The third ratio is determined by a ratio used for stepping up single-phase power from the first voltage to the target voltage.

In some embodiments, systems and/or methods are disclosed for a modular step-up bank (MSUB or M-SUB) for a portable generator system. In some embodiments, the portable generator system comprises: a voltage system for receiving a first voltage; a first MSUB and a second MSUB. In some embodiments, the voltage system receives voltage from a generator. The first MSUB comprises a first frame; a first transformer, the first transformer is mounted on the first frame; a second transformer, the second transformer is mounted on the first frame; a third transformer, the third transformer mounted on the first frame, wherein the first transformer, the second transformer, and the third transformer are configured to step up the first voltage to a second voltage. The second voltage is a voltage of a first distribution system. The first transformer, the second transformer, and the third transformer are mounted on the first frame to be moved as unit. The second MSUB comprises a second frame; a fourth transformer, the fourth transformer mounted on the second frame; a fifth transformer, the fifth transformer mounted on the second frame; and a sixth transformer, the sixth transformer mounted on the second frame. The forth transformer, the fifth transformer, and the sixth transformer are configured to step up the first voltage to a third voltage. The fourth transformer, the fifth transformer, and the sixth transformer are mounted on the second frame to be moved as unit. The third voltage is a voltage of a second distribution system.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

An embodiment of a portable electrical system for providing temporary power is disclosed. The portable electrical system comprises a generator, a step-up system, and a output interface. Electrical power is generated at a first voltage by the generator. Electrical power is stepped up to a second voltage using the step-up system. A distribution system is connected to the step-up system through a output interface to provide the distribution system, and hence customers connected to the distribution system, with electrical power.

Figure 1:
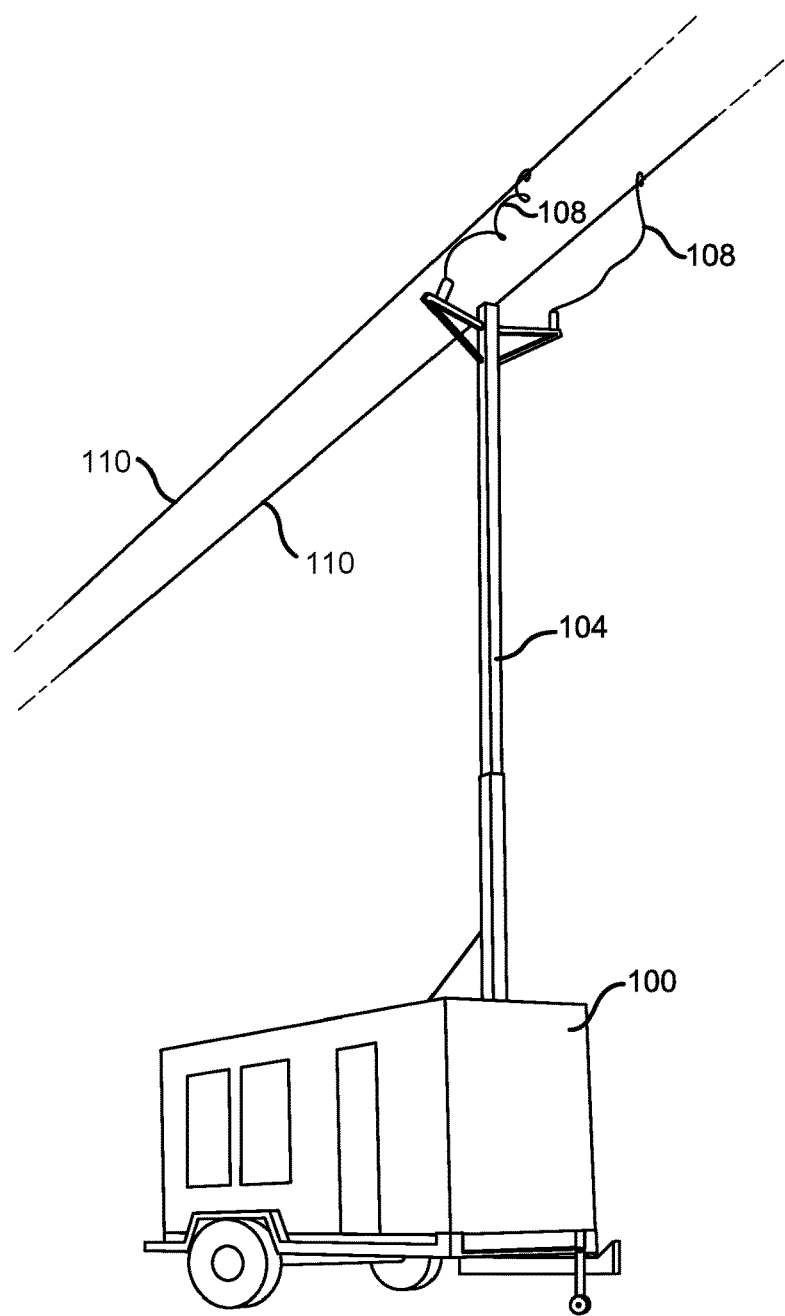
FIG. 1 depicts a simplified drawing of an embodiment of a vehicle for providing temporary power.

Referring first to FIG. 1, a drawing of an embodiment of a vehicle 100 for providing temporary power is shown. The vehicle 100 comprises a generator, a step-up system, and an output interface. In the embodiment shown, the output interface comprises an outrigger 104 and output lines 108. The outrigger 104 is a beam extendable from the vehicle 100 to support the output lines 108 for connection to distribution lines 110. The output lines 108 conduct electricity from the step-up system to the distribution lines 110. In some embodiments, the output interface comprises output lines 108 and not the outrigger 104 (e.g., for connection to distribution lines 110 that are underground). In some embodiments, the output interface is one or more wires connected to the high-voltage side of a transformer.

In some embodiments, the vehicle 100 is a trailer. In some embodiments, the trailer is a double-axle trailer. In some embodiments, the vehicle 100 is a truck. For example, the generator and step-up system are on a flat-bed truck. In some embodiments, the vehicle 100 comprises both a truck and a trailer. In some embodiments, the output interface (optionally including the outrigger 104) is part of the step-up system. In some embodiments, the step-up system is on a truck, and the truck pulls the generator on a trailer. In some embodiments, the generator is on a truck, and the truck pulls the step-up system on a trailer. The output interface (optionally including the outrigger 104) can be optionally on the truck or optionally on the trailer. A person skilled in the art will recognize other configurations. In some embodiments, the generator is optional (e.g., to be connected to the step-up system later). In some embodiments, the vehicle 100, including the generator and/or the step-up system are configured to travel (e.g., legally) on public roads (e.g., total weight does not exceed a threshold, the vehicle has proper lights, the vehicle has proper tires, and/or the vehicle has a proper number of axles for weight). Another example of a portable system for providing temporary electrical power is given in U.S. patent application Ser. No. 14/202,374, filed on Mar. 10, 2014, which is incorporated by reference for all purposes.

Figure 2:
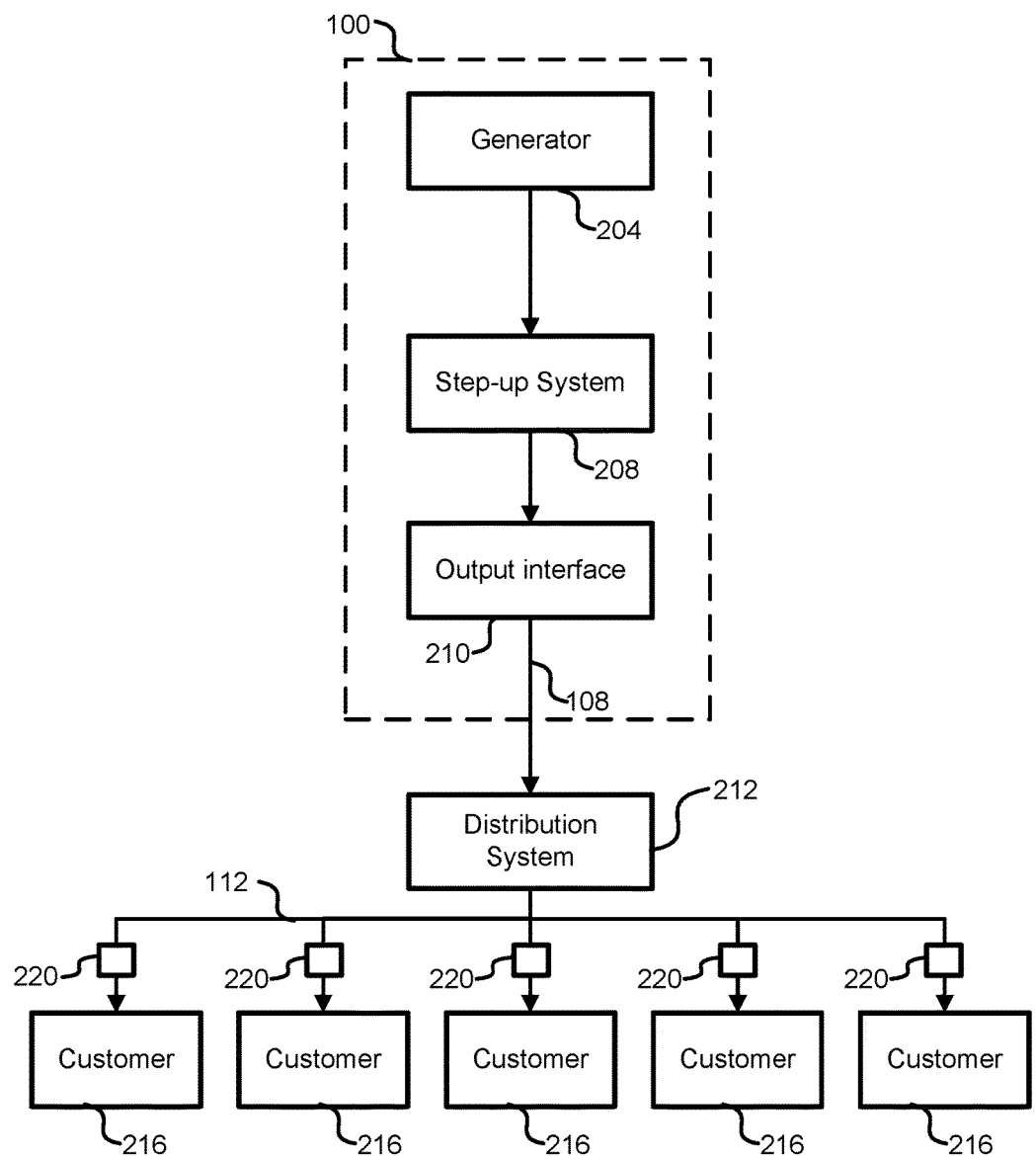
FIG. 2 depicts a simplified block diagram of an embodiment of a system for providing temporary electrical power.

In FIG. 2, a simplified block diagram of an embodiment of a system for providing temporary electrical power is shown. The vehicle 100 comprises a generator 204, a step-up system 208, and an output interface 210. The output interface 210 connects to a distribution system 212 by output lines 108, which are part of the output interface 210. The distribution system 212 transmits electricity through distribution lines 110 to a plurality of customers 216. The distribution lines 110 are part of the distribution system 212. Step-down transformers 220 step down voltage from a distribution voltage of the distribution system 212 to a customer voltage to the customer 216. In some embodiments, the step-down transformers 220 are part of the distribution system 212. In some embodiments, a step-down transformer 220 is part of the customer 216.

In some embodiments, the generator 204 is configured to produce single-phase power and three-phase power, though not necessarily at the same time. Single-phase power can be distributed by one-wire systems, two-wire systems (two hot, 180 degrees out of phase; or one hot and one neutral), or three-wire systems (two hot wires, one wire being a neutral). For example, single-phase system could be energized by legs of a generator (generating in three phases) put in series (e.g., a zigzag configuration). In some embodiments, a one-wire, single-phase system is used to energize a tap (e.g., less than 200, 50, or 10 customers on a tap). Three-phase power can be distributed by three-wire systems or four-wire systems (one wire being a neutral). In some embodiments, the generator 204 is a diesel-powered generator. In some embodiments, the generator 204 is configured to produce 120 volts, line to ground (208 volts line to line for three-phase power, 240 volts line to line for single-phase power), plus or minus 5%, 10%, or 15%. In some embodiments, the generator is configured to generate both single-phase power and three-phase power, though not necessarily at the same time. In some embodiments, the generator 204 is configured to produce 277 volts (line to ground)/480 volts (line to line), plus or minus 5%, 10%, or 15%. In some embodiments, the generator 204 is configured to produce a voltage between 40 and 601 volts.

In some embodiments, the generator 204 produces between 10 kW (kilowatt) and 1 or 2 MW (megawatt) of power. In some embodiments, the generator 204 produces between 10 kW and 450 kW of power in order to be transported on a trailer smaller than a semi-trailer (e.g., producing between 100 kW and 420 kW, such as 100 kW, 205 kW, 300 kW, and/or 420 kW of power). In some embodiments, the generator 204 produces between 100 kW and 450 kW as a tradeoff between power (e.g., number of customers 216 that can be supported) and weight (e.g., to be transported on roads).

In some embodiments, the distribution system 212 is configured to receive electrical power from a transmission system (e.g., through a step-down transformer from the transmission system to the distribution system 212); and the transmission system is configured to receive power from a power plant (e.g., through a step-up transformer from the power plant to the transmission system; such as stepping up to voltages greater than 35,000 volts). In some embodiments, the step-up system 208 is used to provide electrical power (e.g., temporary, such that temporary is less than 30 days, 14 days, 7 days, 3 days, 2 days, or 1 day and greater than 2, 5, 10, 60, or 120 minutes) to the distribution system 212. For example, the step-up system 208 is used to provide temporary electrical power because there is a break in the distribution system 212 so that customers 216 don't receive electrical power (e.g., downed power line from a storm); maintenance is being performed on a part or parts of the distribution system 212, the transmission system, or the power plant; there is a break in the transmission system (e.g., a transmission line is broken and/or a step-down transformer from the transmission system to the distribution system 212 is broken); et cetera.

The step-up system 208 uses step-up transformers (e.g., one to five step-up transformers) to convert voltage from the generator 204 to a higher voltage (e.g., to match voltage of the distribution system 212). In some embodiments, distribution voltage is equal to or between 601 volts and 35,000 volts (e.g., 2.3 kV, 3.3 kV, 4.16 kV, 6.6 kV, 17.2 kV, and 20 kV).

Figure 3:
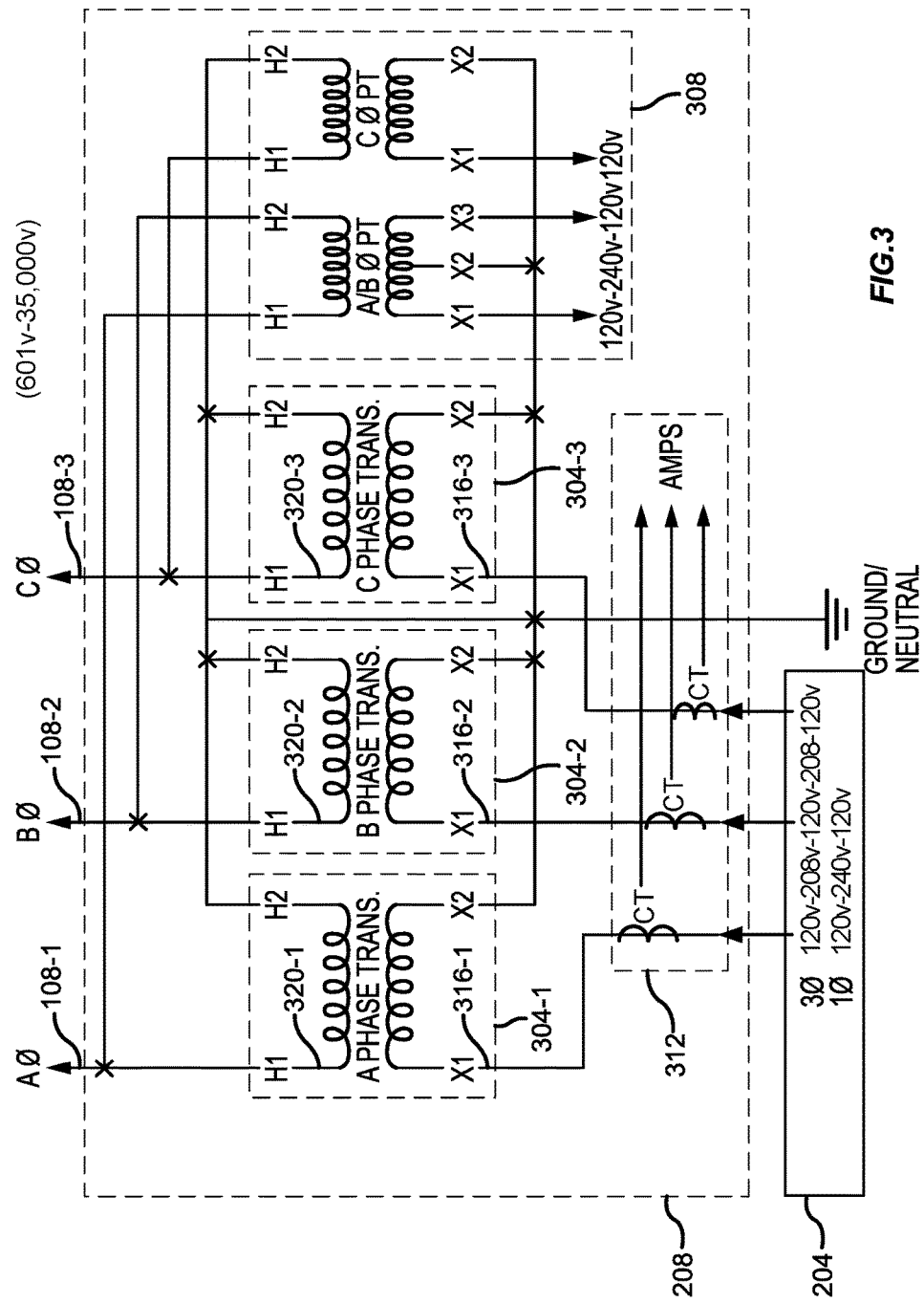
FIG. 3 depicts a simplified schematic of an embodiment of a step-up system for stepping up voltage.

Referring next to FIG. 3, a simplified schematic of an embodiment of a step-up system 208 is shown. The step-up system 208 is sometimes referred to as a step-up bank. The step-up system 208 comprises one or more step-up transformers 304, a potential-transformer bank 308 and a current-transformer bank 312. The step-up transformer 304 has a low-voltage side 316 and a high-voltage side 320. The generator 204 is electrically connected with the low-voltage side 316 of the step-up transformer 304. The Output line 108, which is part of the output interface 210, is electrically connected with the high-voltage side 320 of the step-up transformer 304. The potential-transformer bank 308 is connected between the high-voltage side 320 of the step-up transformer 320 and the output line 108. The current-transformer bank 312 is connected between the generator 204 and the low-voltage side 316 of the step-up transformer 304.

In the embodiment shown, the step-up system 208 comprises a first step-up transformer 304-1, a second step-up transformer 304-2, and a third step-up transformer 304-3. The first step-up transformer 304-1 is connected to a first output line 108-1, the second step-up transformer 304-2 is connected to a second output line 108-2, and the third step-up transformer 304-3 is connected to a third output line 108-3. The first step-up transformer 304-1 steps up A-phase power, the second step-up transformer 304-2 steps up B-phase power, and the third step-up transformer 304-3 steps up C-phase power. In three-phase power, A-phase, B-phase, and C-phase are 120 degrees out of phase. In single-phase power, A-phase and B-phase are 180 degrees out of phase. Thus in stepping up three-phase power, the first step-up transformer 304-1, the second step-up transformer 304-2, and the third step-up transformer 304-3 are used. In stepping up single-phase power, the first step-up transformer 304-1 and the second step-up transformer 304-2 are used; the third step-up transformer 304-3 isn't used. Similarly, for single-phase power, the first output line 108-1 and the second output line 108-2 are used (the third output line 108-3 isn't used); for three-phase power, the first output line 108-1, the second output line 108-2, and the third output line 108-3 are used. In some embodiments, the first step-up transformer 304-1, the second step-up transformer 304-2, and the third step-up transformer 304-3 are wired in a grounded-wye configuration (on the high-voltage side 320 and/or the low-voltage side 316) for safety.

In some embodiments, the step-up transformer 304 weighs more than 500 and/or 1000 pounds and less than 2000 and/or 1500 pounds. In some embodiments, the step-up transformer 304 has a power rating equal to or between 10 kVA and 500 kVA. In some embodiments, weight of the step-up transformer 304 is selected so that a combined weight of the step-up transformers 304 does not exceed 3500 pounds, 4500 pounds, or 7000 pounds so that the vehicle 100 can be pulled by more types of cars without exceeding a tow limit. There is a tradeoff between weight and power rating. The higher the power rating, the larger the conductors, and the more weight. Tow ratings for several trucks are as follows: Ford F-150, 5000-9100 pounds; Toyota Tundra, 6400-10500 pounds; Foton Tunland (used in Japan, Australia, Africa, and Indonesia), about 5000 pounds; Isuzu D max, about 7700 pounds; Nissan Titan, 7000-9300 pounds; Toyota Hilux, 7700 pounds. Thus by keeping the step-up transformers at a lower weight, more trucks can pull the vehicle 100, in the embodiments the vehicle 100 is a trailer; or can have the step-up system 208 mounted on the truck (e.g., the step-up system 208 and the output interface 210 are mounted on the truck and the generator 204 is towed by the truck; or the generator 204 is mounted on the truck and the step-up system 208 and output interface 210 are on a trailer pulled by the truck). Applicant has found that transformers rated at about 75 kVA provide a good tradeoff between power capability and weight. Thus in some embodiments the step-up transformer 304 has a power rating of 75 kVA, or equal to or between 70 kVA and 80 kVA; 50 kVA and 100 kVA; and/or 50 kVA and 200 kVA.

In some embodiments, the step-up system 208 has nine transformers: thee step-up transformers 304; three transformers in the potential-transformer bank 308; and three transformers in the current-transformer bank 312. In some embodiments, the current-transformer bank 312 is optionally not part of the step-up system 208 (e.g., part of the vehicle 100 or part of a different vehicle). In some embodiments, the potential-transformer bank 308 is optionally not part of the step-up system 208 (e.g., part of the vehicle 100 or part of a different vehicle).

In some embodiments, the step-up transformer is 304 a single-phase transformers (e.g., instead of a three-phase transformer). A single-phase transformer steps up, or steps down, only one phase of electrical power. In some embodiments, separate single-phase transformers are used for the step-up transformers 304 to allow the step-up system 208 to step up both single-phase power (e.g., by not using the third step-up transformer 304-3) and three-phase power (e.g., by using the first step-up transformer 304-1, the second step-up transformer 304-2, and the third step-up transformer 304-3). Put another way, in some embodiments each step-up transformer 304 has a separate core. In some embodiments, the first step-up transformer 304-1 is combined with the second step-up transformer 304-2 (e.g., the first step-up transformer 304-1 shares a core with the second step-up transformer 304-1, forming one transformer to step up two phases), which is separate from the third step-up transformer 304-3. Combining the first step-up transformer 304-1 and the second step-up transformer 304-2 is done, in some embodiments, to reduce weight of the step-up system 208, which also reduces the weight of the vehicle 100.

The potential-transformer bank 308 and the current-transformer bank 312 are used to monitor performance of the step-up system 208. The potential-transformer bank 308 comprises one or more transformers to mimic a voltage drop across the step-down transformer 220. By knowing a turn ratio of the potential-transformer bank 308, a voltage of the output line 108 can be calculated. In some embodiments, a transformer similar to the step-down transformer 220 is used as part of the potential-transformer bank. The potential-transformer bank 308 allows a user of the step-up system 208 to monitor a voltage the customer 216 should receive. Thus the user of the step-up system (or electronic control logic, e.g., using voltages of the potential-transformer bank 308 as feedback in a control loop) can increase and/or decrease output voltage of the generator 204 accordingly. In some embodiments, each transformer of the potential-transformer bank 308 is less than 3140 cubic inches. In some embodiments, the potential-transformer bank 308 has one, two, or three transformers.

The current-transformer bank 312 indicates how much current is flowing to step-up transformers 304, and presumably to the output lines 108. In some embodiments, the current-transformer bank 312 is on the low-voltage sides 316 of the step-up transformers 304 so that the current-transformer bank 312 outputs constant currant (amps) regardless of voltage on the high-voltage side 320 of the step-up transformers 304. If the current-transformer bank 312 were placed on the high-voltage side 320, current out of the current-transformer bank would drop depending on a voltage at the high-voltage side 320 of the step-up transformer. Though in some embodiments, the transformer bank 312 is placed on the high-voltage side 320 of the step-up transformers 304. In some embodiments, the current-transformer bank 312 is part of the vehicle 100 and not part of the step-up system 208 (e.g., so that the current-transformer bank 312 doesn't need to be swapped out when swapping a step-up system 208 discussed below). In some embodiments, the current-transformer bank 312 is part of the generator 204.

In some embodiments, there are between one and five step-up transformers 304 in the step-up system 208. For example, there could be one single-phase transformer (for single-line, single-phase power); there could be one three-phase transformer (for just three-phase power); there could be two single-phase transformers (for just single-phase power); one two-phase transformer and one single-phase transformer (the single-phase transformer would not be used for three-phase power); one three-phase transformer and one two-phase transformer (the three-phase transformer used for three-phase power and the two-phase transformer used for single-phase power); three single-phase transformers (shown in FIG. 3); four single-phase transformers (e.g., one of the single-phase transformers is used for single-phase power, single line); or five single-phase transformers (three for three-phase power and two for single-phase power). In some embodiments, three single-phase transformers are used to provide flexibility for providing three-phase power and single-phase power, with reduced weight.

In some embodiments, the generator 204 produces single-phase power having a voltage of 120 V, line-to-ground (or line-to-neutral), plus or minus 5%, 10%, or 15%. In some embodiments, the generator 204 produces a voltage, line to ground, equal to or greater than 96 volts and equal to or less than 118 volts; or equal to or greater than 107 volts and equal to or less than 116 volts; for single-phase power. In some embodiments, the generator 204 produces a voltage, line to ground, equal to or greater than 123 volts and equal to or less than 144 volts; or equal to or greater than 123 volts and equal to or less than 133 volts; for three-phase power.

Figure 4:
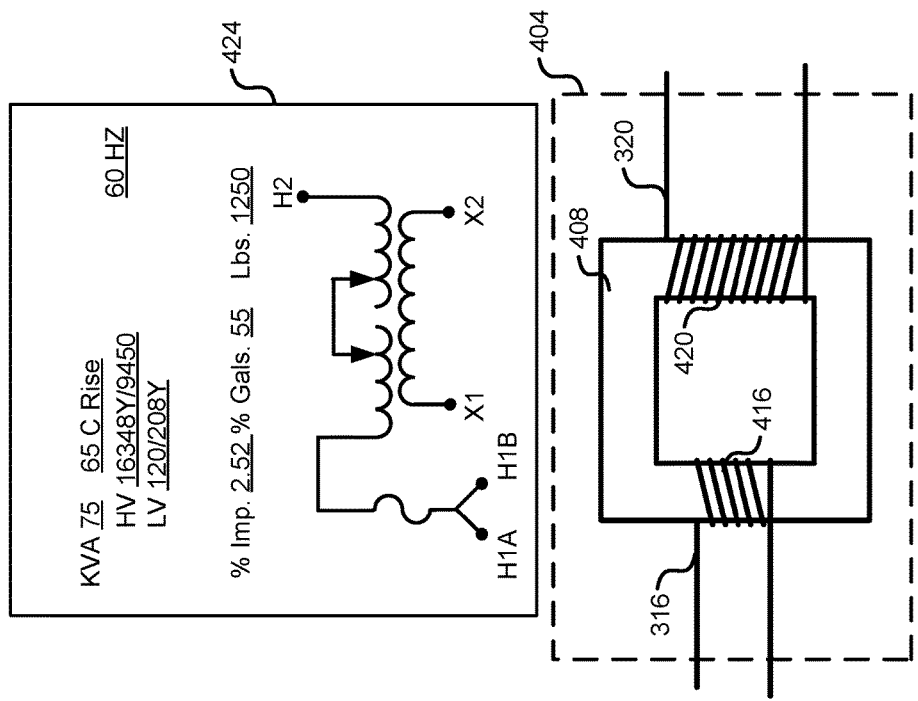
FIG. 4 depicts a simplified diagram of an embodiment of a transformer in a step-up system for providing single-phase power and three-phase power.

Referring next to FIG. 4, a simplified diagram of an embodiment of a transformer for stepping up voltage for both single-phase power and three-phase power is shown. In this disclosure, a transformer for stepping up both single-phase power and three-phase power is sometimes referred to as a hybrid transformer 404. In some embodiments, the hybrid transformer 404 is used as a step-up transformer 304 in the step-up system 208. The hybrid transformer 404 comprises a core 408, a first conductor 416, and a second conductor 420. In some embodiments, the first conductor 416 and/or the second conductor 420 are made of copper to be more resilient (e.g., less fatigue) during transportation. In some embodiments, the first conductor 416 and/or the second conductor 420 are made of aluminum to be cheaper and lighter than copper. The hybrid transformer 404 has a low voltage side 316 and a high voltage side 320. The first conductor 416 is wound a first number of turns around the core 408. The first conductor 416 is on the low-voltage side 316 of the hybrid transformer 404. The second conductor 420 is wound a second number of turns around the core 408. The second conductor 420 is on the high-voltage side 320 of the hybrid transformer 404. A hybrid ratio is the first number of turns divided by the second number of turns of the hybrid transformer 404. A name plate 424 of an embodiment of the hybrid transformer 404 for stepping up voltage from 120 volts, line-to-ground, to 17200 volts, line-to-line, is shown.

Notation:
v=input voltage to a transformer
V=output voltage from a transformer
$v_{LL}^1$; $V_{LL}^1$=single-phase voltage, line to line
$v_{LG}^1$; $V_{LG}^1$=single-phase voltage, line to ground
$v_{LL}^3$; $V_{LL}^3$=three-phase voltage, line to line
$v_{LG}^3$; $V_{LG}^3$=three-phase voltage, line to ground
$N_1$=number of turns on an input side of transformer
$N_2$=number of turns on an output side of transformer $$a = \text{turn ratio} = \frac{N_1}{N_2}$$

$a^1$=turn ratio for stepping up single-phase power
$a^3$=turn ratio for stepping up three-phase power
$a^H$=turn ratio for a hybrid transformer
Line-to-line voltage is related to line-to-ground voltage by:

$$v_{LL}^1 = 2v_{LG}^1 \quad \text{(eq. 1)}$$

$$v_{LL}^3 = \sqrt{3} v_{LG}^3 \quad \text{(eq. 2)}$$

Transformers step up voltage, or step down voltage, according to:

$$\frac{v_{LL}}{V_{LL}} = \frac{N_1}{N_2} = a \quad \text{(eq. 3)}$$

Generators operate using line-to-ground voltage values as inputs. Thus for one transformer to step up (or step down) both single-phase voltage and three-phase voltage to the same line-to-line voltage (i.e., $V_{LL}^1 = V_{LL}^3$), $v_{LL}^1$ must be equal to $v_{LL}^3$ (e.g., within +/−5%, 3%, or 2% of each other):

$$v_{LL}^1 = v_{LL}^3 \quad \text{(eq. 4)}$$

If two different transformers are used to step up voltage (e.g., a first transformer for stepping up single-phase voltage and a second transformer for stepping up three-phase voltage), then a turn ratio $a^1$ of the first transformer would be different from a turn ratio $a^3$ of the second transformer. For example, the first transformer would use $a^1=0.01395$ to step up single-phase voltage from 120 volts (line-to-ground) to 17200 volts (line-to-line):

$$V_{LL}^1 = 17200 \text{ volts};$$
$$v_{LG}^1 = 120 \text{ volts};$$
$$v_{LL}^1 = 240 \text{ volts}$$
$$\frac{v_{LL}^1}{V_{LL}^1} = \frac{240}{17200} = a^1 = 0.01395$$

The second transformer would use $a^3=0.01209$ to step up three-phase voltage from 120 volts (line-to-ground) to 17200 volts (line-to-line):

$$V_{LL}^3 = 17200 \text{ volts};$$
$$v_{LG}^3 = 120 \text{ volts};$$
$$v_{LL}^3 = 208 \text{ volts}$$
$$\frac{v_{LL}^3}{V_{LL}^3} = \frac{208}{17200} = a^3 = 0.01209$$

However, using a hybrid turn ratio $a^H$, between $a^1$ and $a^3$, allows a single transformer to be used for both single-phase power and three-phase power by decreasing line-to-ground voltage of the generator for single-phase power, and increasing the line-to-ground voltage of the generator for three-phase power.

For example, a hybrid transformer 404 having a hybrid ratio, $a^H$=average $(a^1, a^3)=0.013023$ can be used for both single-phase voltage step up and three-phase voltage step up. For single-phase step up, the generator is run at 112 volts:

$$v_{LL}^1 = a^H V_{LL}^1 = 0.013023 * 17200 \text{ volts} = 224 \text{ volts}$$
$$v_{LG}^1 = \frac{v_{LL}^1}{2} = 112 \text{ volts}$$

And for three phase, the generator is run at 129 volts:

$$v_{LL}^3 = a^H V_{LL}^3 = 0.013023 * 17200 \text{ volts} = 224 \text{ volts}$$
$$v_{LG}^3 = \frac{v_{LL}^3}{\sqrt{3}} = 129 \text{ volts}$$

Some generators have a range for adjusting voltage output of the generator. For example, a first generator has a standard output voltage that can be adjusted (i.e., a tolerance)+/−10%. If the standard output voltage is 120 volts, line to ground, then the generator output voltage can run from 108 volts to 132 volts (or +/−12 volts). Thus running the first generator at 112 volts and 129 volts is within the tolerance of the first generator.

In some embodiments, instead of using an average between $a^1$ and $a^3$, a turn ratio for a transformer is used so that input voltages from a generator are about equally offset from the standard voltage (e.g., 120 volts line to ground. For example, $v_{LG}^1=111$ volts, and $v_{LG}^3=129$ volts, for a turn ratio of 0.01295, to step up to 17200 volts (line to line); which is plus and minus nine volts from 120 volts.

In the previous examples, impedance and other losses are not taken into account. Ratios, a, are for an ideal transformer (i.e., no loss). Actual ratios would vary depending on losses. A person of skill in the art would know how to calculate actual ratios from ideal ratios to build a transformer to step up voltages as described in this application.

In some embodiments, the generator 204 can more easily produce a lower voltage than a higher voltage. For example, a generator produces a normal voltage of 120 volts, where normal voltage is a voltage the generator is designed to produce. It is easier to reduce an output voltage of the generator from the normal voltage than to increase the output voltage from the normal voltage. Thus a generator could produce 120 volts, line-to-ground, +5% and −10%. Applicant has found the following formula to work well for calculating $a^H$:

$$a^H = \frac{v_{LL}^{3'}}{V_{LL}^{3'} - (Y * V_{LL}^{3'})}$$

where Y=0.05, and the prime denotes a traditional three-phase system. In some embodiments, Y=0.01 to 0.10; and/or 0.03 to 0.07.

As an example, a hybrid transformer 404 is to step up 120 V normal voltage, line-to-ground, from the generator 204 to 17,200 volts, line-to-line, (a target voltage) of the distribution system 212. Thus:

Y=0.5; $v_{LG}^{3'}$=120 volts; $v_{LL}^{3'}$=208 volts;
$V_{LL}^{3'}$=17200 volts; and $a^H$=0.01273.

With $a^H$=0.0127, the generator 204 would operate at 109 volts, line-to-ground, when supplying single-phase power ($v_{LG}^1$) and 126 volts, line-to-ground, when supplying three-phase power ($v_{LG}^3$) because:

$$V_{LL}(\text{target voltage}) = 17,200 \text{ volts}$$
$$v_{LL} = a^H * V_{LL} = 218 \text{ volts}$$
$$v_{LL}^1 = v_{LL}^3 = v_{LL}$$
$$v_{LG}^1 = \frac{1}{2} v_{LL} = 109 \text{ volts}$$

-continued $$v_{LG}^3 = \frac{1}{\sqrt{3}} v_{LL} = 126 \text{ volts}$$

An example hybrid transformer 404 having $a^H=0.0127$ has a name plate 424 with the following characteristics:

75 kVA, 65 degree Celsius rise time
HV: 16348Y/9450
LV: 120/208Y
60 Hz
% Imp. 2.52
Gals. 55
Lbs. 1250

Below is a list of hybrid ratios $a^H$, for various standard voltages (traditional voltage) and target voltages. In some embodiments, $a^H$ varies by plus or minus 3 percent (assuming that the standard voltage can vary by +/−10%, $a^H$ can vary by +/−2.84%). In the table below, $a^H$ is calculated to have a turn ratio so that the standard voltage is halfway between a voltage while operating the generator for three-phase power and a voltage while operating the generator for single-phase power. The table below gives example values of a hybrid transformer 404.

TABLE 1

| Generator voltage (LG) (preset voltage; or standard voltage) | Distribution voltage (LL) (target voltage) | Hybrid Transformer 404 | | |
|---|---|---|---|---|
| | | LV _/_Y | HV _Y/_ | $a^H$ |
| 120 | 2300 | 120/208 | 2150/1241 | 0.0967 |
| 120 | 4160 | 120/208 | 3889/2245 | 0.0534 |
| 120 | 12470 | 120/208 | 11658/6731 | 0.0178 |
| 120 | 13800 | 120/208 | 12902/7449 | 0.0161 |
| 120 | 17200 | 120/208 | 16081/9284 | 0.0129 |
| 120 | 25000 | 120/208 | 23373/13494 | 0.00889 |
| 120 | 34500 | 120/208 | 32255/18622 | 0.00644 |
| 277 | 2300 | 277/480 | 2150/1241 | 0.223 |
| 277 | 4160 | 277/480 | 3889/2245 | 0.123 |
| 277 | 12470 | 277/480 | 11658/6731 | 0.0412 |
| 277 | 13800 | 277/480 | 12902/7449 | 0.0372 |
| 277 | 17200 | 277/480 | 16081/9284 | 0.0298 |
| 277 | 25000 | 277/480 | 23373/13494 | 0.0205 |
| 277 | 34500 | 277/480 | 32255/18622 | 0.0149 |
| 277 | 35000 | 277/480 | 32722/18892 | 0.0147 |
| 127 | 15000 | 127/220 | 14024/8097 | 0.0157 |
| 127 | 20000 | 127/220 | 18698/10795 | 0.0118 |
| 220 | 15000 | 220/380 | 14024/8097 | 0.0272 |
| 220 | 20000 | 220/380 | 18698/10795 | 0.0204 |

A person of skill in the art will recognize that instead of modifying HV (high voltage) numbers, LV (low voltage) numbers could be modified (or a combination of both numbers). For example a hybrid transformer with LV: 120/208; HV: 16081/9284 is the same as a hybrid transformer LV: 128/222; HV: 17200/9930; because both have $a^H=0.0129$. Also, a transformer could be written for single phase. For example, a transformer rated: LV: 120/240; HV: 18568/9284 has a turn ration 0.0129, which is the same as LV: 120/208; HV: 16081/9284.

In some embodiments, input voltage (i.e., voltage from the generator 204), line-to-ground, for single phase is at least 6%, 6.5%, or 7% from the standard voltage and/or the input voltage, line-to-ground, for three phase is at least 6%, 6.5%, or 7% from the standard voltage (and less than 15%, 20% and/or 30% variance from the standard voltage). Traditionally, a customer voltage rated at 120 volts, line to ground, is not provided less than 116 volts or more than 125 volts. Thus it would not be obvious for a generator to be run at more than 4.5 or 5 percent variance of the standard voltage.

Figure 5:
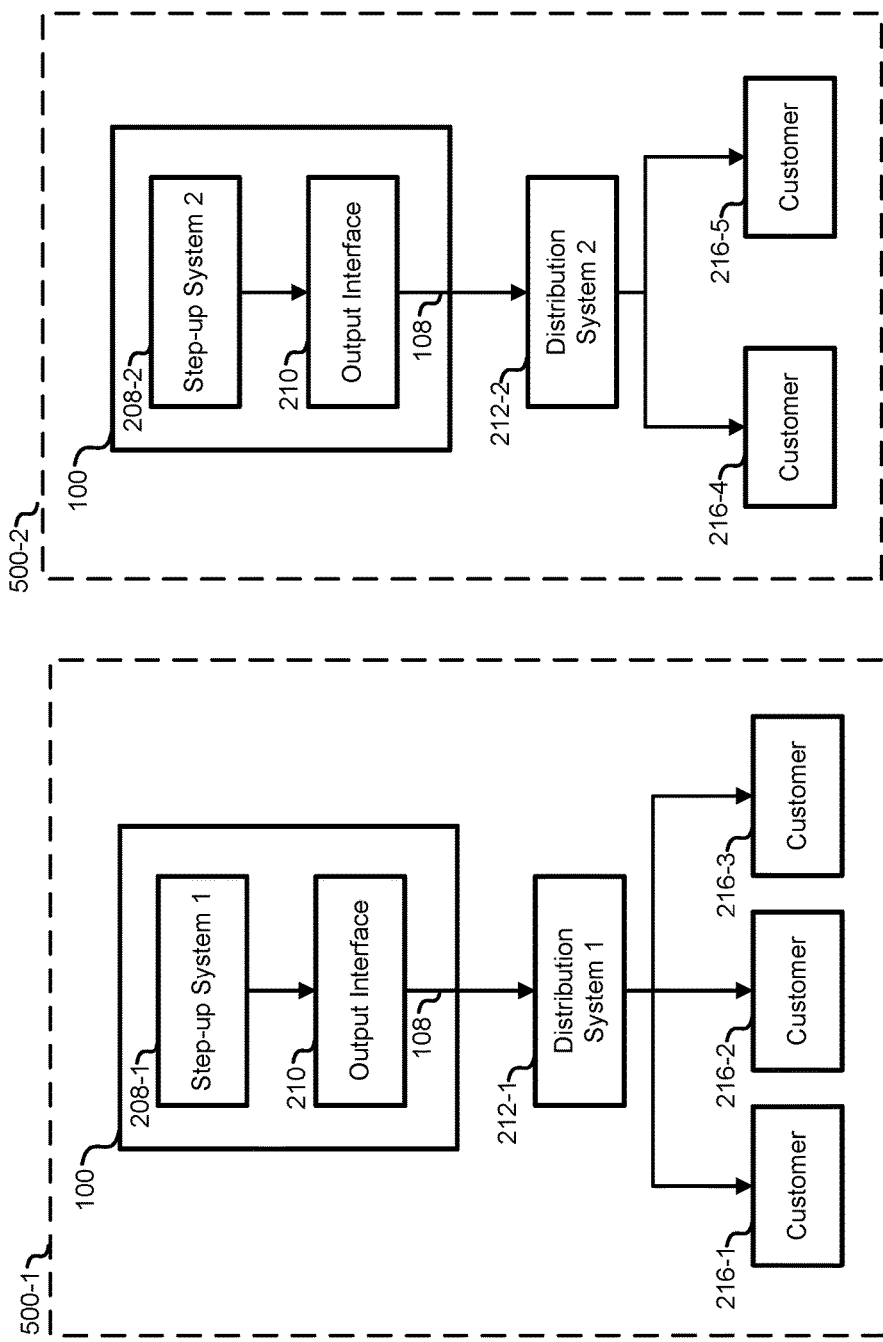
FIG. 5 depicts a simplified diagram of an embodiment of a modular step-up system for providing power to two different distribution systems.

FIG. 5 depicts a simplified diagram of an embodiment of a modular step-up system for providing power to two different distribution systems. Distribution voltages are not standard to only one voltage. Distribution voltages in the United States include 7.2 kV, 12.74 kV, 17.2 kV, 23 kV, 25 kV, and 34.5 kV. In the United Kingdom, 11 kV and 33 kV are used for distribution voltages. In South Africa, 11 kV and 22 kV are used. In some embodiments, step-up systems 208 that are swappable (e.g., modular) are used to service different customers 216 connected to different distribution systems 212 having different voltages, while reducing equipment needed to provide temporary power.

In FIG. 5, the vehicle 100 is shown with the output interface 210 electrically connected with a first distribution system 212-1 in a first configuration 500-1 and the output interface 210 electrically connected with a second distribution system 212-2 in a second configuration 500-2. The first configuration 500-1 is at a first time. The second configuration 500-2 is at a second time, the first time being earlier than the second time.

In the first configuration 500-1, the vehicle 100 comprises a first step-up system 208-1 and the output interface 210. The output interface 210 is electrically connected with a first distribution system 212-1 using the output line 108. A first customer 216-1, a second customer 216-2, and a third customer 216-3 receive electrical power from the first distribution system 212-1. The first distribution system 212-1 uses a first distribution voltage.

In the second configuration 500-2, the vehicle 100 comprises a second step-up system 208-2 and the output interface 210. The output interface 210 is electrically connected with the second distribution system 212-2 using the output line 108. A fourth customer 216-4 and a fifth customer 216-5 receive electrical power from the second distribution system 212-2.

In some embodiments, the vehicle 100 further comprises the generator 204 in the first configuration 500-1 and/or in the second configuration 500-2. In some embodiments, the vehicle 100 comprises a first generator 204 in the first configuration 500-1 and a second generator 204 in the second configuration 500-2.

The second distribution system 212-1 uses a second distribution voltage. For example, the first distribution voltage is 12.74 kV and the second distribution voltage is 34.5 kV. In another example, the first distribution voltage is 17.2 kV and the second distribution voltage is 23 kV. The first step-up system 208-1 comprises step-up transformers 304 having a different ratio than step-up transformers 304 of the second step-up system 208-2.

In some embodiments, modular step up banks are used so that the vehicle 100 (e.g., a trailer) is towable by more types of vehicles (e.g., trucks). For example, in some embodiments, one step-up transformer weighs 304 between 1000 pounds (543 kg) and 2000 pounds (907 kg). Three step-up transformers 304 could weigh between 3000 pounds (1360 kg) and 6000 pounds (2722 kg). Tow ratings for several trucks are as follows: Ford F-150, 5000-9100 pounds; Toyota Tundra, 6400-10500 pounds; Foton Tunland (used in Japan, Australia, Africa, and Indonesia), about 5000 pounds; Isuzu D max, about 7700 pounds; Nissan Titan, 7000-9300 pounds; Toyota Hilux, 7700 pounds. If the trailer weight and generator weight are included, having two step-up systems could exceed the tow capacity of several trucks. Thus by having modular step-up banks, the vehicle 100 can be towed (if the vehicle 100 is a trailer) by more types of trucks and be able to service a wider variety of electrical-distribution systems (e.g., distribution systems 212 using different voltages). In some embodiments, one or more semi-trailers are used. For example, a 500 kW, 1 MW, or 2 MW generator is placed on a semi-trailer, and the step-up system 208 is on the same semi-trailer or a different trailer.

In some embodiments, the vehicle 100 comprises two or more step-up systems 208 and one or more switches for selecting a step-up system 208 for connection to a distribution system 212.

Figure 6:
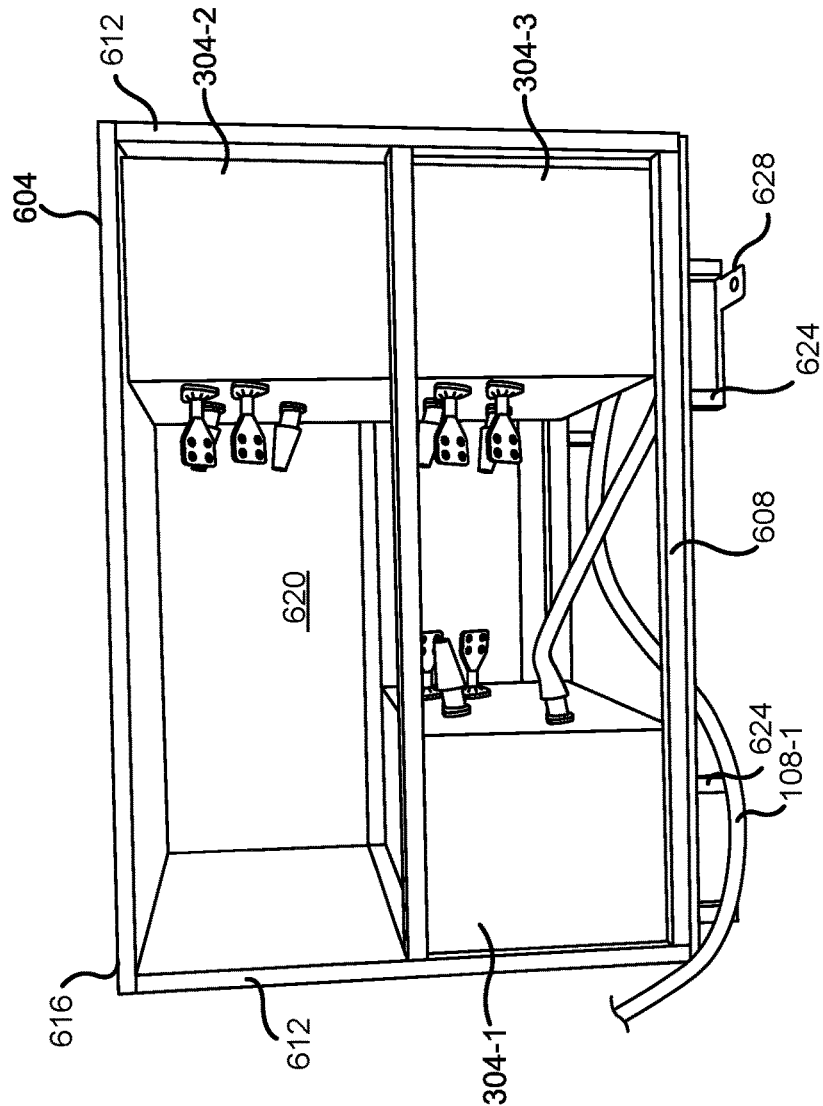
FIGS. 6-8 depict figures of an embodiment of a modular step-up system.
Figure 7:
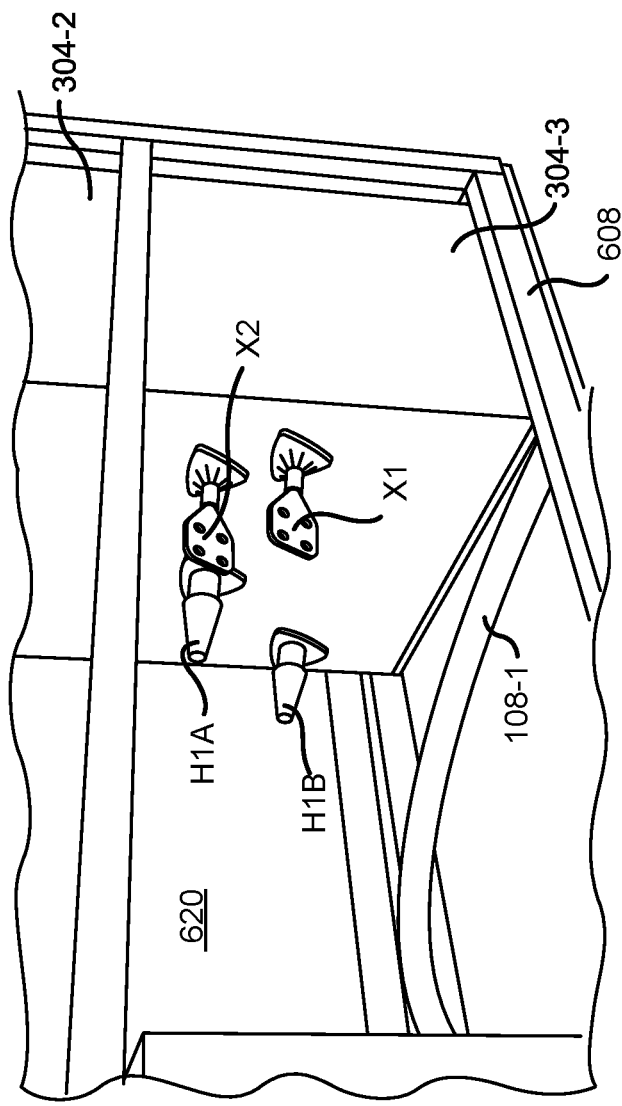
Figure 8:
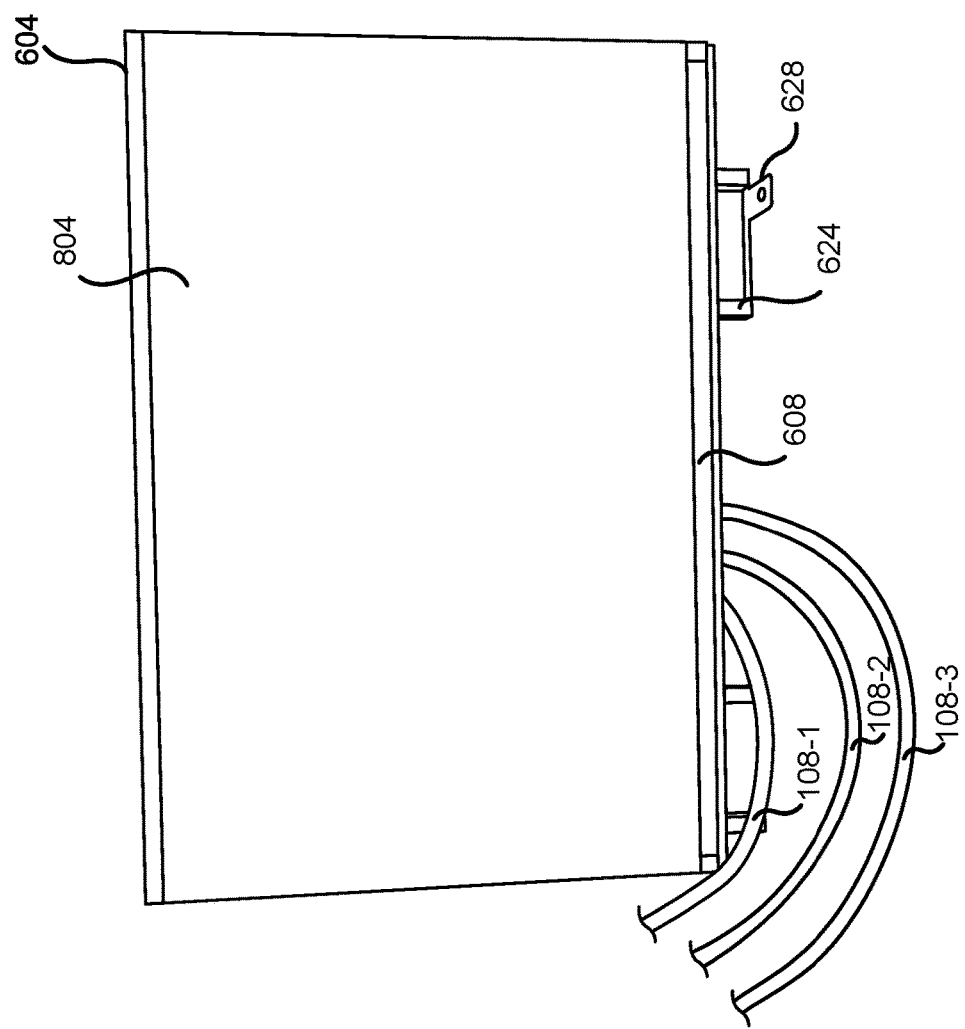

Referring next to FIGS. 6-8, simplified figures of an embodiment of a step-up system 604 that is modular is shown. The step-up system 604 that is modular is an embodiment of one of the step-up systems 208 in FIG. 5. In FIG. 6, three step-up transformers 304 are shown on a frame 608. The frame 608 has sides 612 and a top 616 to encase the three step-up transformers 304. Potential transformers, which are part of the potential-transformer bank 308, are also encased by the sides 612 and the top 616 (e.g., the potential-transformer bank 308 is placed above the first step-up transformer 304-1).

The frame 608 provides structural support for the step-up transformers 304 (e.g., the frame 608 is made of a rigid material, such as steel). In some embodiments, the sides 612 include a back cover 620 and a front cover. In some embodiments, the sides are made of a rigid material (e.g., steel). The frame 608 optionally comprises forklift supports 624. The frame is removably attached to the vehicle 100. (e.g., the frame 608 is bolted to a floor of the vehicle 100 by a flange 628).

The frame 608 may be removed by mechanically disconnecting the frame 608 from the vehicle 100 and electrically disconnecting the step-up transformer 304 from output interface 210 (e.g., disconnecting output lines 108). In some embodiments, cables leading to the generator 204 are also disconnected from the step-up transformers 304. In some embodiments, a fork lift is used to remove the frame 608, including the step-up transformers 304 from the vehicle 100.

In some embodiments, the third step-up transformer 304-3 is de-energized if single-phase power is used. In some embodiments, the second step-up transformer 304-2 is de-energized if single-phase power is used.

Referring next to FIG. 7, another simplified drawing of an embodiment of the step-up system 604 is shown. The third step-up transformer 304-3 is shown with connections X1 (to the generator 204); X2 (to ground); H1A (to output lines 108); and H1B (another connection). H2 is internally grounded.

In FIG. 8, the frame is shown with a front cover 804. Electrical connections are made. Sides 612, including the front cover 804 are attached to increase safety and/or reduce tampering from non-authorized parties while the step-up system 604, which is modular, is used. Additionally, the sides 612 are useful during storage and/or to protect the step-up transformers 304 from foreign objects (e.g., enclosed for safety). The step-up system 604 is configured to be moved as one unit. In some embodiments, the frame 608 is configured to slide on a rail. In some embodiments, the step-up system 604 optionally comprises three temperature sensors to monitor temperatures of the step-up transformers 304.

Figure 9:
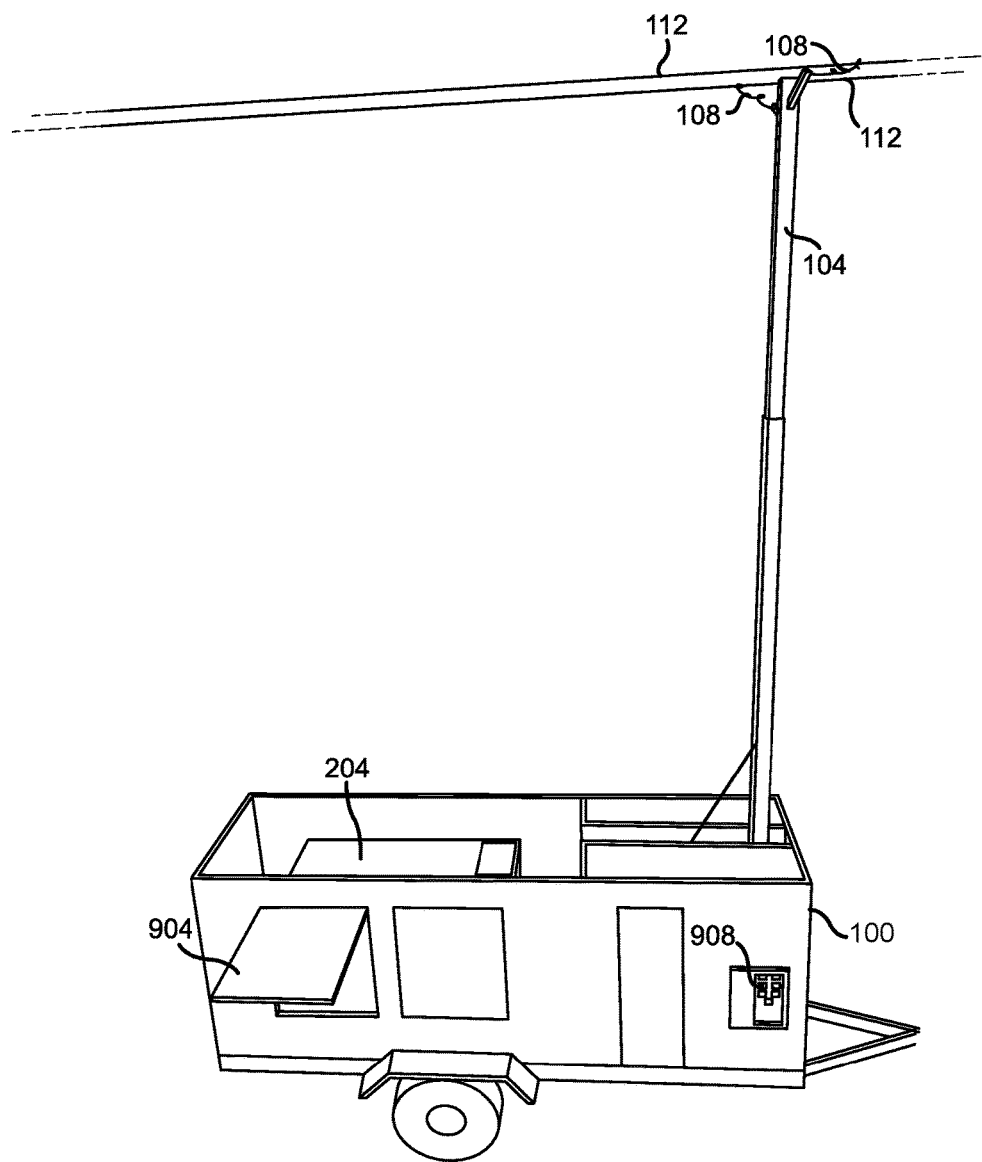
FIG. 9 depicts another figure of the embodiment of the vehicle for providing temporary electrical power.

FIG. 9 shows another view of an embodiment of the vehicle 100. FIG. 9 shows the outrigger 104 and the generator 204. The outrigger 104 is collapsible and configured to be stowed above the generator 204 and enclosed by sides and/or top of the vehicle 100. An access door 904 provides access to the generator 204. A display panel 908 displays information about the step-up system 208 (the step-up system 208, e.g., on frame 608, is behind the display panel 908). For example, the display panel 908 provides what current is passing through the step-up transformers 304, based on readings from the current-transformer bank 312; the display panel 908 provides what voltage(s) are at the output interface 210, based on readings from the potential-transformer bank 308; and/or the display panel 908 provides temperatures of the step-up transformers 304.

Figure 10:
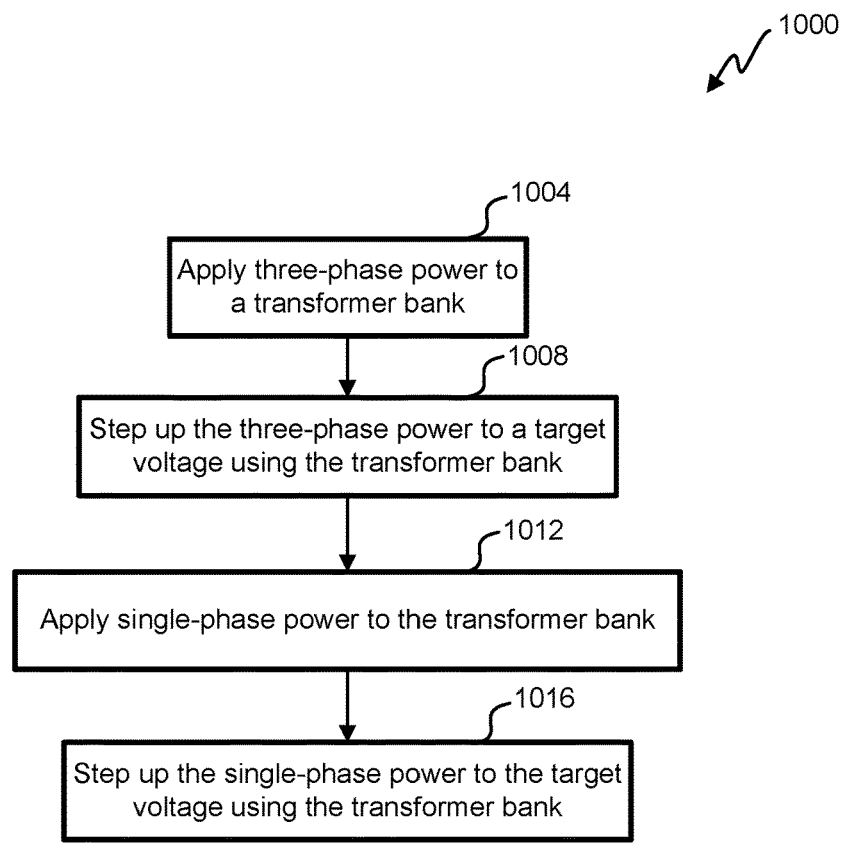
FIG. 10 illustrates a flowchart of an embodiment of a process for using a step-up bank to step up both single-phase power and three-phase power.

FIG. 10 illustrates a flowchart of an embodiment of a process 1000 for using a step-up bank (e.g., step-up system 208) to step up both three-phase power and single-phase power. Process 1000 begins in step 1004 by applying three-phase power to a transformer bank at a first voltage. The first voltage is measured from line to ground. For example, three-phase power is applied to the step-up system 208 of FIG. 3. The three-phase power is provided by the generator 204. The transformer bank comprises at least one transformer (e.g., step-up transformer 304). The transformer bank steps up the three-phase power to a target voltage, step 1008. In some embodiments, the target voltage is a distribution voltage (e.g., equal to or greater than 601 volts and equal to or less than 35,000 volts), measured from line to line. The target voltage is predetermined based on the distribution voltage normally used in a distribution system 212 (e.g., 2.3 kV, 4.16 kV, 7.2 kV, 11 kV, 12.47 kV, 13.8 kV, 17.2 kV, 22 kV, 23 kV, 25 kV, 33 kV, or 34.5 kV).

In step 1012, single-phase power at a second voltage is applied to the transformer bank. The single-phase power is provided by the generator 204, or a different generator. The second voltage is measured from line to ground. The second voltage is stepped up to the target voltage using the transformer bank, step 1016.

In some embodiments, the first voltage and/or the second voltage is 120 volts plus or minus 13 volts. In some embodiments, the first voltage is equal to or greater than 123 volts and equal to or less than 133 volts. In some embodiments, the second voltage is equal to or greater than 107 volts and equal to or less than 116 volts.

Figure 11:
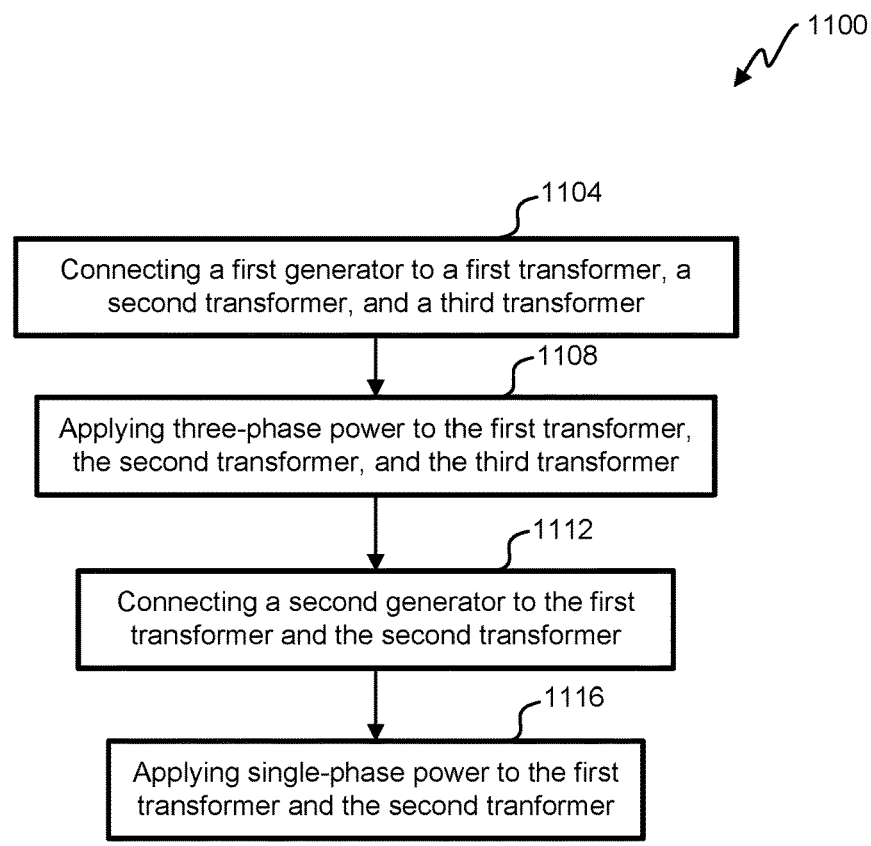
FIG. 11 illustrates a flowchart of an embodiment of a process for using transformers in a step-up bank to step up both single-phase power and three-phase power.

FIG. 11 illustrates a flowchart of an embodiment of a process 1100 for using transformers in a step-up bank to step up both three-phase power and single-phase power. Process 1100 begins in step 1104 with connecting a first generator to a first transformer (e.g., the first step-up transformer 304-1), a second transformer (e.g., the second step-up transformer 304-2), and a third transformer (e.g., the third step-up transformer 304-3). In step 1108, three-phase power is applied to the first transformer, the second transformer, and the third transformer. For example, power applied to the first transformer is 120 degrees out of phase from power applied to the second transformer and to the third transformer.

In step 1112, a second generator is connected to the first transformer and the second transformer of the of the step-up bank. In some embodiments, the second generator is the same as the first generator. In some embodiments, the second generator is different from the first generator. Single-phase power is applied to the first transformer and the second transformer. For example, power applied to the first transformer is 180 degrees out of phase with power applied to the second transformer. FIG. 3 provides an example of the generator 204 connected to three transformers where the first generator is the same as the second generator.

Figure 12:
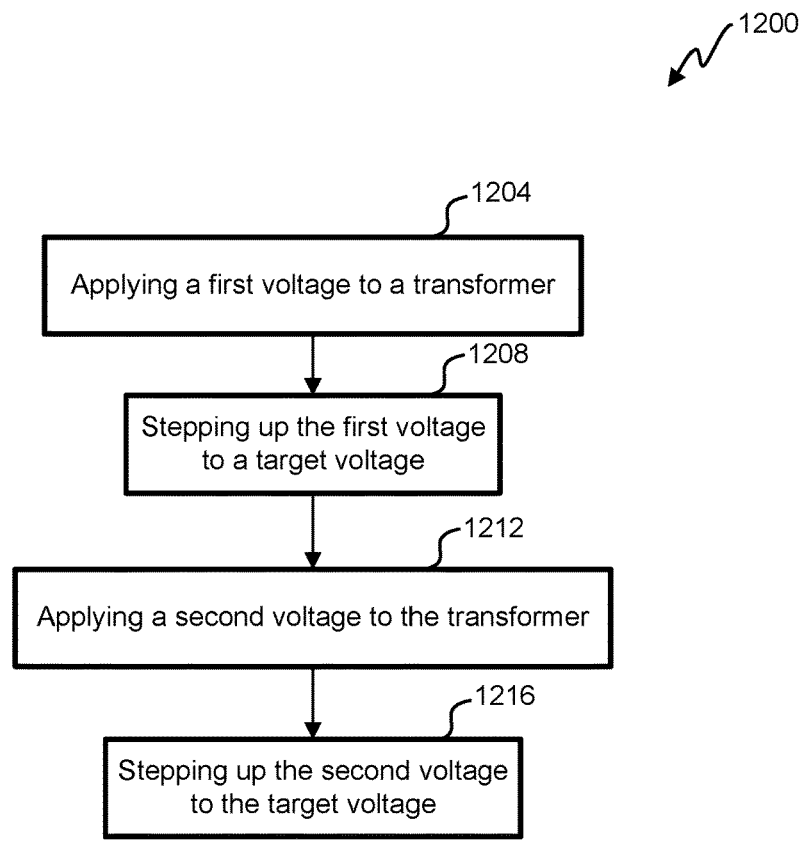
FIG. 12 illustrates a flowchart of an embodiment of a process for using a hybrid transformer for stepping up voltages to a target voltage.

FIG. 12 illustrates a flowchart of an embodiment of a process 1200 for using a hybrid transformer for stepping up voltages to a target voltage. Process 1200 beings in step 1204 by applying a first voltage to a transformer. The first voltage is measured from line to ground. The transformer has a first ratio of winding (e.g., a turn ratio). For example, the first ratio is the hybrid ratio, $a^H$. The first ratio is greater than a second ratio and less than a third ratio. The second ratio is determined by a ratio for stepping up three-phase power from a preset voltage to a target voltage, wherein the preset voltage is measured from phase to neutral. For example, the preset voltage is a traditional voltage (e.g., 120 V or 277). The target voltage is the distribution voltage. An example of the second ratio is $a^3$. The third ratio is determined by a ratio used for stepping up single-phase power from the preset voltage to the target voltage. An example of the third ratio is $a^1$.

In step 1208, the transformer steps up the first voltage to the target voltage. For example, the first voltage is 126 volts, line-to-ground, and the first voltage is stepped up to a distribution voltage (target voltage) of 17,200 volts, line-to-line. The first voltage is stepped up to the target voltage based on the first ratio.

In step 1212, a second voltage is applied to the transformer. The second voltage is measured from line to ground (and/or neutral). The second voltage is less than the first voltage. For example, the second voltage is 109 V, line-to-neutral, for stepping up to a target voltage of 17,200 volts, line-to-line. In step 1216, the second voltage is stepped up to the target voltage using the transformer. The second voltage is stepped up to the target voltage based on the first ratio.

In some embodiments, the hybrid transformer has a power rating between 40 kVA and 500 kVA. In some embodiments, the first ratio is $a^H$ in Table 1, plus or minus 1%, 3%, and/or 5%. In some embodiments, the first ratio is an average of the second ratio and the third ratio, plus or minus 1%, 3%, and/or 5%. In some embodiments, the first voltage is between 6.5% and 20% above the preset voltage. In some embodiments, the second voltage is between 6.5% and 20% below the preset voltage.

Figure 13:
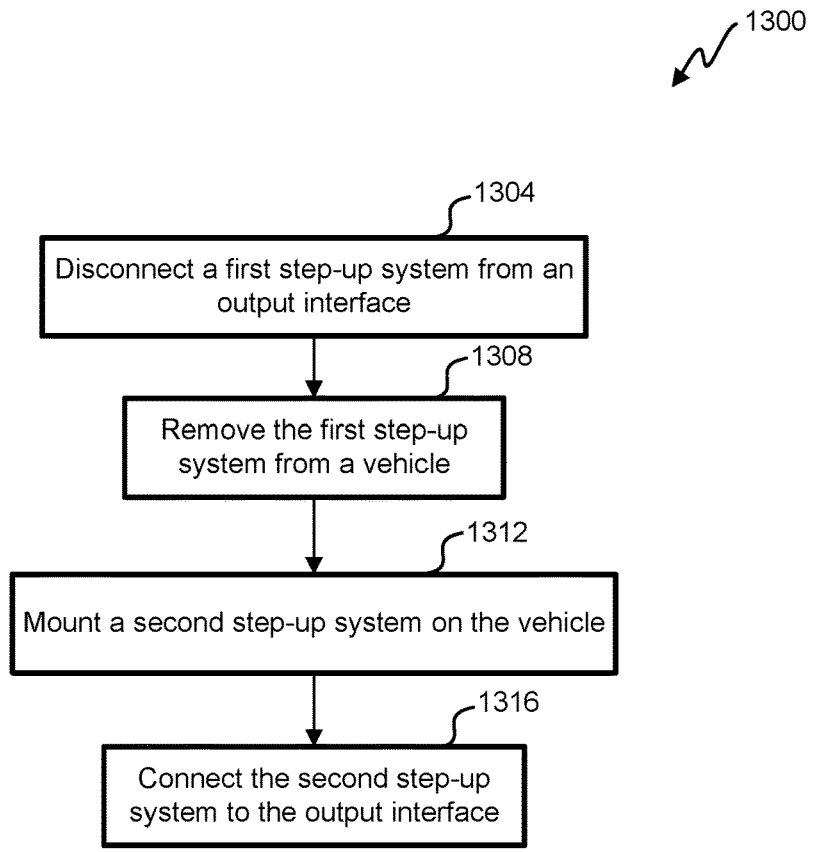
FIG. 13 illustrates a flowchart of an embodiment of a process for exchanging step-up banks.

FIG. 13 illustrates a flowchart of an embodiment of a process 1300 for exchanging step-up banks. Process 1300 begins in step 1304 with electrically disconnecting a first step-up system (e.g., the first step-up system 208-1 of FIG. 5) from the output interface 210. The output interface 210 is optionally part of the vehicle 100. In some embodiments, electrically disconnecting includes disconnecting the high-voltage side 320 of the step-up transformer 304 from the output line 108. In some embodiments, the low-voltage side 316 is electrically disconnected.

In step 1308, the first step-up system 208-1 is removed from the vehicle 100. The output interface 210 remains with the vehicle 100. In some embodiments, the first step-up system 208-1 is removed from the vehicle 100 using a forklift (e.g., the first step-up system 208-1 is a step-up system 604 that is modular). In some embodiments, the first step-up system 208-1 is removed from the vehicle 100 using a crane and/or hoist.

In step 1312, a second step-up system 208-2 is mounted to the vehicle 100. For example, the second step-up system 208-2 is located in the vehicle 100 where the first step-up system 208-1 was. In some embodiments, the second step-up system 208-2 is a step-up system 604 that is modular. In some embodiments, mounting includes bolting the frame of the step-up system 604 to the vehicle.

In step 1316, the second step-up system 208-2 is electrically connected to the output interface 210 (e.g., by connecting high-voltage sides(s) 320 of step-up transformers 304 to output line(s) 108). In some embodiments, the generator 204 is also disconnected from the first step-up system 208-1 and connected to the second step-up system 208-2. In some embodiments, the output interface 210 is electrically connected to a first distribution system 212-1 before the first step-up system 208-1 is disconnected, and/or the output interface 210 is electrically connected to a second distribution system 212-1 after the second step-up system 208-2 is connected to output interface 210.

In some embodiments, the first step-up system and/or the second step-up system comprises two transformers, three transformers, four transformers, or five transformers for stepping up voltage. The transformers are single-phase transformers in that they each step up only one phase of applied power, though some of the transformers may step up single-phase power and three-phase power (e.g., the first step-up transformer 304-1 is a single-phase transformer but is used to step up both single-phase power and three-phase power).

Figure 14:
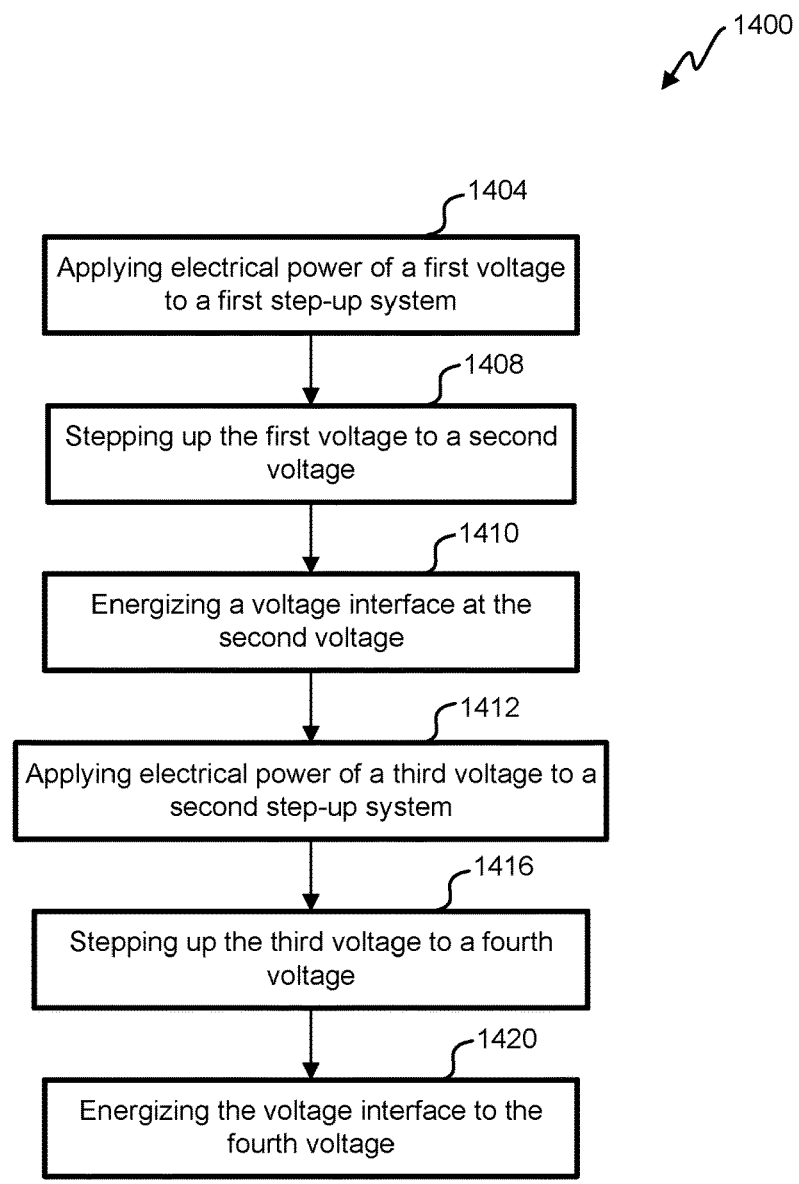
FIG. 14 illustrates a flowchart of an embodiment of a process for using modular step-up banks.

FIG. 14 illustrates a flowchart of an embodiment of a process 1400 for using modular step-up banks. Process 1400 begins in step 1404 by applying electrical power of a first voltage to a first step-up system 208-1, wherein the first step-up system 208-1 has one or more transformers. In some embodiments, the first step-up system 208-1 is a step-up system 604 that is modular. In some embodiments, the one or more transformers are step-up transformers 304 and/or hybrid transformers 404.

In step 1408, the first voltage is stepped up to a second voltage by the one or more transformers of the first step-up system 208-1. The first step-up system 208-1 energizes the output interface 210 at the second voltage, step 1410.

In step 1412, electrical power of a third voltage is applied to a second step-up system 208-2 (e.g., later in time than steps 1404-1410). The second step-up system 208-2 comprises one or more transformers. In some embodiments, the first step-up system 208-1 is a step-up system 604 that is modular. In some embodiments, modular means moveable as a unit (e.g., three step-up transformers 304 are moved together as one unit) and/or transformers are connected to a common support structure for offloading and/or on-loading to the vehicle 100. The second step-up system 208-2 steps up the third voltage to a fourth voltage using the one or more transformers of the second step-up system 208-2, step 1416. The second step-up system 208-2 energizes the output interface 210 at the fourth voltage, step 1420.

In some embodiments, the first voltage is the same as the third voltage (e.g., 120 V+/−10%), and/or the second voltage is different from the fourth voltage (e.g., second voltage is to a first distribution system 212-1 having a first distribution voltage and the fourth voltage is to a second distribution system 212-2 having a second distribution voltage). In some embodiments, the first voltage is different from the third voltage; and the second voltage is the same as the fourth voltage. For example, the distribution line voltage may be the same, but a generator using a different voltage (e.g., 480 instead of 120) might be used (e.g., to provide power to more customers, because the higher-voltage generator also produced more power).

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. For example, instead of three phase, other polyphase systems, besides three-phase systems, could be used. For example, two-phase power (e.g., used near Philadelphia, Pa.; where one phase differs from the other phase by 90 degrees), four-phase power, six-phase, or twelve-phase power could be used. For example, a hybrid transformer could be designed to work for both single-phase power and two-phase power. Additionally, different countries have different standard voltages. Instead of a standard voltages for 120 single phase and 120/208 three-phase in the United States, other voltages could be designed for. For example, 220 volts single phase and 220/380 three-phase for France and Germany with distribution voltages at 15,000 volts and/or 20,000 volts (also 127 single phase; 127/220 three phase). For 127 volts, standard voltage, the generator 204 is run at 118 volts (+/−5 volts) (line to ground) for single-phase power and 136 volts (+/−5 volts) (line to ground) for three-phase power. For 220 volts line to ground standard voltage, the generator 204 is run at 204 volts (+/−7 volts) (line to ground) for single-phase power and 235 volts (+/−7 volts) (line to ground) for three-phase power.

Further, the generator 204 could be made to produce a non-standard voltage(s), and hybrid transformers calculated accordingly. For example, in an area that covers distribution voltages of both 17200 volts and 25000 volts, $a^H$ could equal 0.0199, +/−3% (LV: 120/208Y, HV: 10450Y/6033) and supply 17200 volts by generating 342 volts line to line and supply 25000 volts while generating 498 volts line to line. In some embodiments, the generator 204 produces a voltage, line to ground, between 50 and 600 volts, depending on the application. In some embodiments, the generator 204 produces a voltage, line to ground, between 50 and 1000 volts. In some embodiments, the generator 204 produces voltage, line to ground, greater than 90 volts.

Additionally, embodiments discussed in this application can be used with additional equipment. For example, in some embodiments power from a power plant is shut off from reaching the distribution system 212 (or at least a part of the distribution system) before output lines 108 are connected to the distribution system 212; and the generator 204 is shut off, and/or the output interface 210 is disconnected from the distribution system 212 before power from the power plant energizes the distribution system 212. In some embodiments, paralleling equipment is used to hot swap power from the vehicle 100 and power from the power plant. This could be useful if maintenance is to be performed upstream (electrically) from the customers 216.

The embodiments were chosen and described in order to explain the principles of the invention and practical applications to thereby enable others skilled in the art to best utilize the invention in various embodiments and with various modifications as are suited to the particular use contemplated.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc.

A recitation of "a", "an", or "the" is intended to mean "one or more" unless specifically indicated to the contrary.

All patents, patent applications, publications, and descriptions mentioned here are incorporated by reference in their entirety for all purposes. None is admitted to be prior art.

While the principles of the disclosure have been described above in connection with specific apparatuses and methods, it is to be clearly understood that this description is made only by way of example and not as limitation on the scope of the disclosure.

What is claimed is:

1. A system for stepping up voltage for both single-phase electrical power and three-phase electrical power, the system comprising:
    a first transformer for stepping up voltage;
    a second transformer for stepping up voltage;
    a third transformer for stepping up voltage; and
    wherein:
        the first transformer, the second transformer, and the third transformer are configured to work together to step up three-phase power and have ratios of windings that are configured to step up three-phase power of a first voltage, at a first time, to a target voltage; and
        in the same system, the first transformer and the second transformer are configured to work together to step up single-phase power and have ratios of windings that are configured to step up single-phase power of a second voltage from the first voltage, at a second time different from the first time, to the same target voltage.

2. The system for stepping up voltage for both single-phase electrical power and three-phase electrical power as of claim 1, further comprising an enclosure that encases the first transformer, the second transformer, and the third transformer.

3. The system for stepping up voltage for both single-phase electrical power and three-phase electrical power of claim 1, wherein the target voltage is equal to or greater than 601 volts and equal to or less than 35,000 volts.

4. The system for stepping up voltage for both single-phase electrical power and three-phase electrical power of claim 1, wherein the target voltage is 2300, 4160, 12470, 13800, 17200, 25000, or 34500 volts.

5. The system for stepping up voltage for both single-phase electrical power and three-phase electrical power of claim 1, wherein the first voltage, measured phase to neutral, is greater than the second voltage, measured phase to neutral.

6. The system for stepping up voltage for both single-phase electrical power and three-phase electrical power of claim 1, wherein the first voltage, measured phase to neutral, is equal to or greater than 123 volts and equal to or less than 144 volts.

7. The system for stepping up voltage for both single-phase electrical power and three-phase electrical power of claim 6, wherein the first voltage, measured phase to neutral, is equal to or greater than 123 volts and equal to or less than 133 volts.

8. The system for stepping up voltage for both single-phase electrical power and three-phase electrical power of claim 6, wherein the second voltage, measured phase to neutral, is equal to or greater than 96 volts and equal to or less than 118 volts.

9. The system for stepping up voltage for both single-phase electrical power and three-phase electrical power of claim 1, wherein:
    the first transformer is configured to step up a first phase of the three-phase power;

the second transformer is configured to step up a second phase of the three-phase power; and the third transformer is configured to step up a third phase of the three-phase power.

10. The system for stepping up voltage for both single-phase electrical power and three-phase electrical power of claim 8, further comprising one or more potential transformers for monitoring the target voltage and one or more current transformers for monitoring current to the first transformer, the second transformer, and/or the third transformer.

11. The system for stepping up voltage for both single-phase electrical power and three-phase electrical power of claim 10, wherein:

the one or more potential transformers are connected to a high-voltage side of the first transformer, the second transformer, and/or the third transformer; and the one or more current transformers are connected to a low-voltage side of the first transformer, the second transformer, and/or the third transformer.

12. The system for stepping up voltage for both single-phase electrical power and three-phase electrical power of claim 8, wherein the system is part of a vehicle configured to travel on a road.

13. The system for stepping up voltage for both single-phase electrical power and three-phase electrical power of claim 8, further comprising a generator and/or an output interface.

\* \* \* \* \*